(12) United States Patent
Vauchel (10) Patent No.: US 8,413,346 B2
(45) Date of Patent: Apr. 9, 2013

(54) DEVICE FOR CENTERING AN AIR INLET STRUCTURE ON A CENTRAL STRUCTURE OF A NACELLE

(75) Inventor: Guy Bernard Vauchel, Harfleur (FR)

(73) Assignee: Aircelle, L'orcher (FR)

( * ) Notice: Subject to any disclaimer, the term of this patent is extended or adjusted under 35 U.S.C. 154(b) by 0 days.

(21) Appl. No.: 13/061,812

(22) PCT Filed: Jul. 8, 2009

(86) PCT No.: PCT/FR2009/000844
§ 371 (c)(1), (2), (4) Date: Mar. 2, 2011

(87) PCT Pub. No.: WO2010/026302
PCT Pub. Date: Mar. 11, 2010

(65) Prior Publication Data
US 2012/0096730 A1 Apr. 26, 2012

(30) Foreign Application Priority Data
Sep. 2, 2008 (FR) ...................... 08 04800

(51) Int. Cl.
*G01D 21/00* (2006.01)
(52) U.S. Cl. .......................... 33/644; 33/520
(58) Field of Classification Search .............. 33/644, 33/520
See application file for complete search history.

(56) References Cited

U.S. PATENT DOCUMENTS

| 3,157,215 | A | * | 11/1964 | Zahodiakin | 411/267 |
| 4,006,661 | A | * | 2/1977 | Sims, Jr. | 411/11 |
| 5,139,381 | A | * | 8/1992 | Lubreski et al. | 411/433 |
| 5,746,558 | A | | 5/1998 | Nygren, Jr. et al. | |
| 6,349,480 | B1 | * | 2/2002 | Baulier et al. | 33/645 |
| 7,383,636 | B2 | * | 6/2008 | Knopik et al. | 33/203.18 |
| 2012/0096730 | A1 | * | 4/2012 | Vauchel | 33/644 |

FOREIGN PATENT DOCUMENTS
FR 608599 7/1926
FR 800265 7/1936
(Continued)

OTHER PUBLICATIONS
International Search Report; PCT/FR2009/000844; Oct. 29, 2009.

*Primary Examiner* — Yaritza Guadalupe-McCall
(74) *Attorney, Agent, or Firm* — Brinks Hofer Gilson & Lione (57) ABSTRACT

The invention relates to a device (50) for centering a movable structure (4) on a stationary structure (5) of a nacelle, comprising: a centering pin (52) mounted on a pin holder (54) attached onto the movable structure (4) or onto the stationary structure (5), the centering pin (52) having a central axis (56) and a receiving bore (60) mounted onto a bore holder (62) attached onto the stationary structure (5) or onto the movable structure (4), said receiving bore (60) being capable of receiving at least the centering pin (52), characterized in that the centering device (50) also comprises a movable interface system, capable of overlapping the central axis (56) of the centering pin (52) and the central axis of said interface system or of the receiving bore (60) and capable of receiving said centering pin (52) in a central opening, and a locking means capable of locking said interface system. The invention also relates to a nacelle including such a device (50).

14 Claims, 4 Drawing Sheets

FOREIGN PATENT DOCUMENTS

| | | |
|---|---|---|
| FR | 800560 | 7/1936 |
| FR | 2616474 | 12/1988 |
| FR | 2757823 | 7/1998 |
| FR | 2781849 | 2/2000 |
| FR | 2906568 | 4/2008 |
| GB | 2274490 | 7/1994 |

* cited by examiner

DEVICE FOR CENTERING AN AIR INLET STRUCTURE ON A CENTRAL STRUCTURE OF A NACELLE

TECHNICAL FIELD

The invention relates to a device for centering an air inlet structure on a median structure of a nacelle.

The invention also relates to a nacelle comprising such a centering device.

BACKGROUND

In general, an aircraft nacelle has a structure comprising an air inlet structure, a median structure and a downstream structure. The term "downstream" here refers to the direction corresponding to the direction of the cold air flow penetrating the turbojet engine. The term "upstream" refers to the opposite direction.

The nacelle has a downstream jet nozzle whereof the outlet is situated downstream of the turbojet engine. Further upstream, the downstream section generally houses thrust reverser means intended to surround the combustion chamber of the turbojet engine. The median structure is positioned downstream of the air inlet structure so as to surround the fan of the turbojet engine. The air inlet structure is situated upstream of the turbojet engine serving to propel the aircraft.

The air inlet structure comprises, on one hand, and air inlet lip and, on the other hand, a downstream structure on which the lip is fastened. The air inlet lip is adapted to allow the optimal collection towards the turbojet engine of the air necessary to power the fan and the internal compressors of the turbojet engine. The downstream structure is intended to suitably channel the air towards the vanes of the fan. This downstream structure generally includes an external panel and an internal panel. The internal panel includes an acoustic shroud making it possible to attenuate the noises created by the turbojet engine as well as the vibrations of the structures. The downstream structure and the air inlet lip are fastened upstream of a casing of the fan belonging to the median structure of the nacelle.

Depending on the temperature and relative humidity conditions on the ground or in flight, frost can form on the profile of the lip, in particular at the inside profile. This frost formation can be dangerous for the mechanical operation of the stationary and rotating portions of the turbojet engine and cause a decrease in performance. Deicing systems for this part of the air inlet lip have therefore been developed to resolve this problem.

Currently, maintenance operations on this equipment housed inside the air inlet structure require builders to provide access holes for accessing this various equipment. However, these holes are not always sufficient. It is thus sometimes necessary to verify the internal equipment of the air inlet structure using specific tools, such as an endoscope. Such specific tools do not always enable a satisfactory monitoring.

Moreover, to replace some of the internal equipment, it is in general necessary to place the entire air inlet structure. Such a placement requires significant tools and causes an immobilization of the propulsive assembly and therefore generally of the airplane.

An air inlet structure has been proposed formed by an external panel fastened to the air inlet lip and at least one internal panel fastened to the casing of a median structure. The air inlet structure is translationally mobile relative to the median structure using a system of rails fastened on the acoustic shroud. At the end of maintenance to close the air inlet structure on the median structure, it is known from application FR 06-08599 (publication number FR 2 906 568) to use a centering device in the form of a centering pin in order to guide the closing along an axis of the air inlet lip on the acoustic shroud.

However, the covering of the air inlet lip and the acoustic shroud as well as the alignment of the centering pin relative to the receiving bore must be very precise to prevent any friction or jamming of a nature to prevent the closing of the air inlet lip on the acoustic shroud.

It is also known from applications FR 08-00265 and FR 08-00560 to use additional locking means positioned respectively behind or in front of the centering device.

However, the association of the centering device and locking means requires very precise geometries of the parts to limit the play between the air inlet lip and the acoustic shroud in order to ensure good centering and also a good pick-up of mechanical stresses. Such a configuration causes a relatively high production cost.

BRIEF SUMMARY

One aim of the present invention is therefore to provide an effective centering device that is easy to implement and makes it possible to avoid any risk of jamming, in the aforementioned particular case of an air inlet structure that is mobile relative to a median nacelle structure, but also in the more general case of any structure that is mobile relative to a stationary nacelle structure.

To that end, according to a first aspect, the invention relates to a centering device of a mobile structure on a fixed structure of a nacelle including:
  a centering pin mounted on a pin holder attached onto the mobile structure or onto the fixed structure, the centering pin having a central axis, and
  a receiving bore mounted onto a bore holder attached onto the fixed structure or onto the mobile structure, said receiving bore being capable of receiving at least the centering pin,
  remarkable in that the centering device also comprises a movable interface system, capable of overlapping the central axis of the centering pin and the central axis of said interface system or of the receiving bore and capable of receiving said centering pin in a central opening, and a locking means capable of locking said interface system.

The device according to the invention advantageously makes it possible to limit any jamming inasmuch as said device is capable of ensuring closing, even if there is a misalignment between the centering pin and the receiving bore.

The device according to the invention has the advantage of being easy to implement because it authorizes a more significant manufacturing limit than in the prior art. Indeed, it is no longer necessary to machine the parts very precisely as in the prior art so that the latter parts cooperate perfectly with each other. Thus, advantageously, the cost and production time are decreased.

According to other features of the invention, the device according to the invention includes one or several of the following optional features considered alone or according to all possible combinations:
  the central axis of the interface system and the central axis of the centering pin are substantially parallel and not distinct from each other;
  the interface system is a disc whereof the central orifice has a diameter substantially equal to that of the centering pin, which makes it possible to maintain the centering pin in the interface system;

the disc includes a peripheral portion surrounding a central portion, said peripheral portion being able to be thinner than the central portion;

the interface system is mounted mobile in translation in the receiving bore along an axis substantially perpendicular to the central axis of said system;

the locking means include locking pads suitable for locking the peripheral portion, which makes it possible to ensure good locking of the interface system;

the locking pads are activated electrically, which makes it possible to maintain the centering pin in the receiving bore remotely and on command;

the interface system includes a ball pivot mounted in the central orifice of the disc, which makes it possible to absorb any misalignment between the parts;

the pin is mounted on a ball pivot fastened in the pin holder;

the interface system is mounted on the pin support mobile in translation along an axis substantially perpendicular to the central axis of said pin, which makes it possible to keep the receiving bore stationary relative to the centering pin;

the interface system includes a multitude of locking lugs mounted mobile in the bore holder, which makes it possible to determine the diameter of the central orifice and also to ensure the proper locking of the centering pin once it is inserted;

the centering pin has a first section and a second section surrounding a recess having a diameter smaller than those of the first section and the second section, which makes it possible to associate the centering function of the device according to the invention with a locking function in the engagement maneuvering of the elements in each other, said mobile structure is an air inlet structure and said fixed structure is a median nacelle structure.

According to another aspect, the invention relates to a nacelle for a turbojet engine comprising an air inlet structure and a median structure, wherein the nacelle includes a centering device for centering the air inlet structure on the median structure according to the invention.

BRIEF DESCRIPTION OF THE DRAWINGS

The invention will be better understood upon reading the non-limiting description that follows, done in reference to the appended figures.

DETAILED DESCRIPTION

Figure 1:
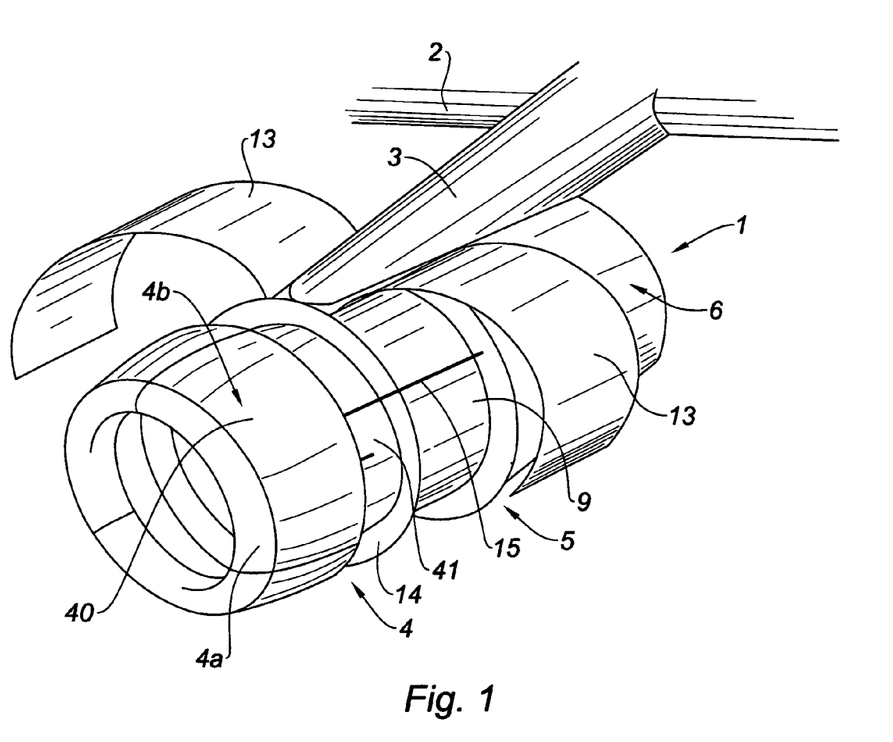
FIG. 1 is a perspective view of a nacelle of the invention surrounding a turbojet engine.

A nacelle 1 according to the invention as illustrated in FIG. 1 constitutes a tubular housing for a turbojet engine (not visible) for which it serves to channel the air flows that it generates while defining internal and external aerodynamic lines necessary to obtain optimal performance. It also houses different components needed for the operation of the turbojet engine as well as related systems such as a thrust reverser.

The nacelle 1 is intended to be fastened to a fixed structure of an aircraft, such as a wing 2, via a pylon 3. More precisely, the nacelle 1 has an air inlet structure 4, a median structure 5 surrounding a fan (not visible) of the turbojet engine, and a rear structure 6 surrounding the turbojet engine and generally housing a thrust reverser system (not shown).

The present invention will be described in the following in the particular case where it is applied to the centering of the air inlet structure 4 relative to the median structure 5, but this is in no way limiting.

The air inlet structure 4 is divided into two zones. The first zone corresponds to an inlet lip 4a adapted to allow the optimal collection of air towards the turbojet engine of the air necessary to power the fan and internal compressors of the turbojet engine. The second zone corresponds to a downstream structure 4b comprising an external panel 40 and an internal panel 41 (see FIGS. 1 and 2). On the internal panel 41, the lip 4a is fastened and intended to suitably channel the air towards the vanes 8 of the fan 6.

Figure 2:
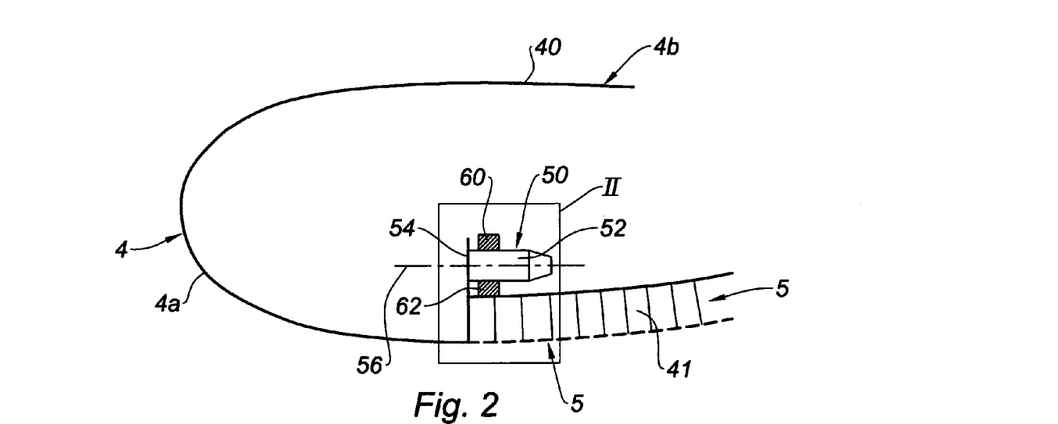
FIG. 2 is a longitudinal diagrammatic cross-sectional view of the interface area of an air inlet structure and a median structure of the nacelle of the invention.

In the particular embodiment chosen to illustrate the invention, the lip 4a is integrated into the external panel 40 so as to form a single disassemblable piece, the internal panel 41 being fastened upstream of a casing 9 of the fan belonging to the median structure 5 of the nacelle 1, for example, via mounting clips.

FIG. 1 shows the air inlet structure 4 with the external panel 40 in a partial open position. In this embodiment, the opening of said external panel can only occur after opening of lateral fan covers 13 equipping the median section. The air inlet structure 4 can be configurable and comprise a plurality of external panels 40 each defining a corresponding air inlet lip portion 4a. In this case, the air inlet structure 4 has seams. However, these seams extend longitudinally relative to the nacelle 1, they have only a negligible impact on the aerodynamic continuity of the air inlet structure 4.

The internal panel(s) 41 is(are) intended to suitably channel the air towards the vanes (not shown) of the fan. The internal panel(s) 41 is(are) fastened at their downstream end to an upstream end of the median structure 5, in particular at the casing 9, via mounting clips. Thus, the internal panel(s) 41 form(s), with the median structure 5, a stationary structure relative to the nacelle 1 of the invention. Moreover, the internal panel(s) 41 comprises(—)an acoustic shroud intended to attenuate the noise annoyances due to the operation of the turbojet engine and the vibrations of the structure of the nacelle 1. The acoustic shroud can be made up of a honeycomb structure or any other structure making it possible to attenuate the noise annoyances.

The nacelle 1 of the invention can also comprise guide means (not shown) of the external panel(s) 40 suitable for allowing a substantially rectilinear movement of the external panel(s) 40 towards the upstream of the nacelle 1 so as to be able to open the air inlet structure 4 (see FIG. 1).

Moreover, closing the lip 4a is also ensured by the centering device 50 according to the invention.

To that end, the device 50 according to the invention includes:

a centering pin 52 mounted on a pin holder 54 fastened on the air inlet structure 4, said pin 52 having a central axis 56, and a receiving bore 60 mounted on a bore holder 62 fastened on the median structure 5, said receiving bore 60 being suitable for receiving at least the centering pin 50.

It is also possible for the centering pin 52 and the receiving bore to be mounted on the median structure 5 and on the air inlet structure 4, respectively.

The device 50 according to the invention also includes a mobile interface system 70 suitable for superimposing the central axis 72 of said interface system 70 and the central axis 56 of the centering pin 52 or the central axis of the receiving bore and that 56 of the centering pin. Said interface system 70 also being suitable for receiving said centering pin 52 in a central orifice 71. The device 50 of the invention also includes locking means 80 suitable for locking said interface system 70 in particular in the position where the centering pin 52 is inserted into the interface system 70.

Figure 3A:
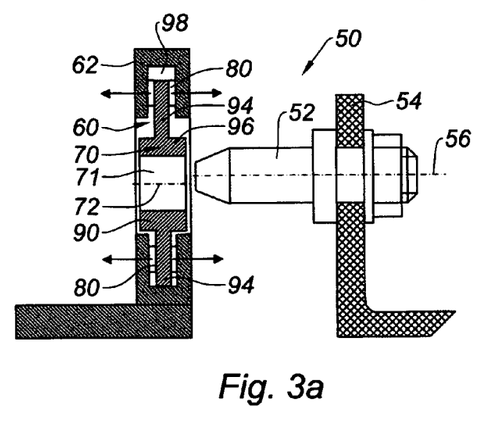
FIGS. 3a and 3b are an enlargement of zone II showing one embodiment of the device according to the invention.
Figure 3B:
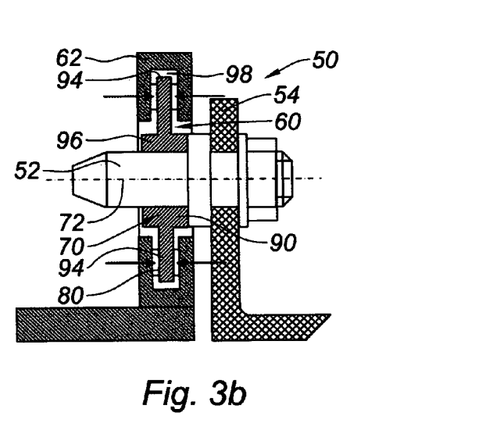

Said system 70 is then configured to:

move in order to substantially superimpose the central axis 72 of the interface system and the central axis 56 of the centering pin or the receiving bore 60 to allow the insertion of the centering pin 52 into the receiving bore 60, and be maintained by the locking means 80 in the position where the centering pin 52 is inserted into the receiving bore 60 (see FIGS. 3a and 3b). Typically, the diameter of the centering pin 52 is defined to take all of the stresses in flight in relation to the arrangement and with the number of centering devices used.

The central axis 72 of the interface system and the central axis 56 of the centering pin are substantially parallel. The latter parts 72 and 56 can be distinct from each other or not. In the case where the latter parts 72 and 56 are not distinct from each other, the centering of the air inlet lip 4a on the median structure 5 has difficulties, for example with clipping.

The interface system 70 is advantageously mobile when the centering pin 52 is inserted into the receiving bore 60. Preferably, the interface system 70 is mobile in translation in the receiving bore 60 along an axis substantially perpendicular to the central axis 72 of the interface system.

Because of this, when the centering pin 52 has a central axis 56 substantially not distinct from each other with the central axis 72 of the interface system, the interface system 70 moves in the receiving bore 60 such that the central axis 72 of said system is combined with the central axis 56 of the centering pin. Thus, the centering pin 52 cooperates with the receiving bore 60 without it being necessary to precisely machine the elements allowing centering of the air inlet lip 4a on the median structure 5. Moreover, advantageously, the device 50 of the invention prevents any adjustment or blocking to the installation of the air inlet structure 4 and the median structure 5. It is also no longer useful to provide, during maintenance, periodic adjustment monitoring and rectification actions of the device 50 according to the invention. It is then possible to limit the cost and production and maintenance time of the device 50 according to the invention.

Moreover, the maneuver of the air inlet structure 4 relative to the median structure 5 is done without mechanical stress since the interface system 70 absorbs any misalignment of the centering pin 52. The interface surface of the centering pin 52 and the receiving bore 60 remains intact.

Thus, no parasitic stress between the centering pin 52 and the receiving bore 60 is passed on to the median structure 5 and the air inlet structure 4.

According to one embodiment not shown, the device 50 according to the invention is coupled to centering devices known by those skilled in the art without an interface system 70. Said known devices are, for example, of the centering pin type inserted into a receiving bore.

FIGS. 3a and 3b show a first embodiment of the device 50 according to the invention. More particularly, FIG. 3a illustrates a configuration in which the centering pin 52 is not inserted into the receiving bore 60. FIG. 3b illustrates a configuration in which the centering pin 52 is inserted into the receiving bore 60.

In this embodiment, the interface system 70 is mounted in the receiving bore 60 while having reduced play relative to the play inherent to the machining of the interface system 70 and the receiving bore 60. The interface system 70 is in the form of a disc 90 having a central orifice 71 with a diameter substantially equal to that of the centering pin 52. The central orifice 71 and the interface system can have a combined central axis.

The play being reduced to its minimum, it makes it possible to ensure good geometric positioning of the centering pin 52 relative to the receiving bore 60. Such a configuration makes it possible to avoid any adjustment or blocking to the installation of the elements of the nacelle 1 of the invention.

The disc 90 can have a peripheral portion 94 surrounding a central portion 96, said peripheral portion 94 being able to be thinner than the central portion 96. The peripheral portion 94 can thus be engaged in an orifice 98 of the receiving bore. The interface system 70 is mounted in the receiving bore 60 mobile in translation along an axis perpendicular to the central axis 72 of the interface system. Such a configuration allows the centering pin 52 to absorb any misalignment of the central axis 56 of the centering pin relative to the central axis 72 of the interface system.

When the locking device 80 is deactivated, the movement of the interface system 70 is made free in the receiving bore 60. The disc 90 then abuts on the bottom of the orifice 98. The movement play is advantageously defined so that the presentation cone of the centering pin 52 is always in the enclosure of the central orifice 71 of the interface system 70.

Locking means 80 make it possible to lock the centering pin 52 in the position in which the latter is inserted in the receiving bore 60. The locking means 80 are, preferably, locking pads situated in the orifice 98 of the receiving bore to lock the peripheral portion 94 of the peripheral interface system which makes it possible to ensure good locking of the interface system 70. The number of locking pads is determined by those skilled in the art as needed.

According to one embodiment, the locking pads are electrically activated, preferably by a current outage locking system, i.e. with a system that is located in the locked position when it is not electrically powered, and unlocked when it is electrically powered. To that end, the maintenance of the centering pin 52 in the receiving bore 60 can be ensured remotely and on command.

The locking command can advantageously be associated with the motorized opening command of the air inlet structure 4.

During the opening or closing maneuver, the locking means 80 are deactivated so as to free the interface system 70. At the end of closing, the locking pads are preferably activated by locking the centering pin 52 in the position driven along the central axis of the latter.

The device 50 according to the invention can include a power system carried by the element of the nacelle 1 of the invention carrying the receiving bore 60, in particular for the electrical control.

Figure 4A:
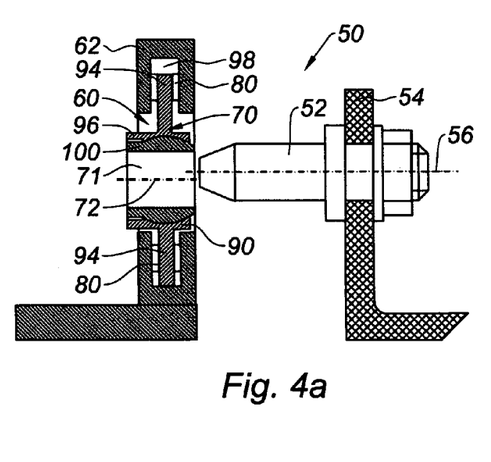
FIGS. 4a and 4b are an alternative of the embodiment of the device according to the invention of FIGS. 3a and 3b.
Figure 4B:
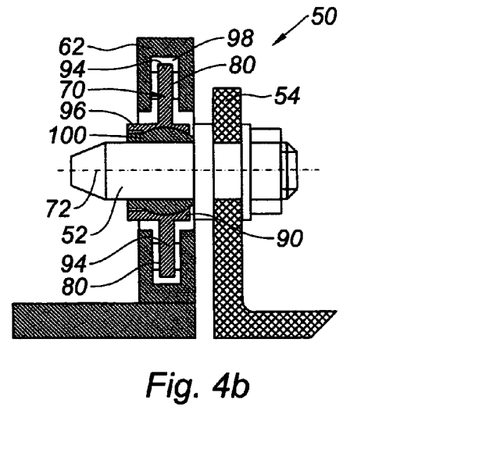

FIGS. 4a and 4b show a second embodiment of the device 50 of the invention. More particularly, FIG. 4a illustrates a configuration in which the centering pin 52 is not inserted into the receiving bore 60. FIG. 4b illustrates a configuration in which the centering pin 52 is inserted in the receiving bore 60.

According to this alternative, the interface system 70 includes a ball pivot 100 mounted in the central orifice 71 of the receiving bore 60, in particular the disc 90. In the case where the ball pivot 100 is inserted into the disc 90, the wall of the central portion 96 is thinned so as to have a central orifice 71 with a diameter substantially equal to that of the centering pin 52.

Thus, any relative misalignment between the central axes 56 and 72, but also between any other centering devices installed on the periphery of the nacelle 1 of the invention, are absorbed. Because of this, this type of alignment does not harm the centering of the air inlet structure 4 on the median structure 5.

Advantageously, the displacement of the ball pivot 100 is limited in order to offer good relative positioning in relation to the central axis 72 of the interface system during the insertion of the centering pin 52 and the receiving bore 60.

Figure 5A:
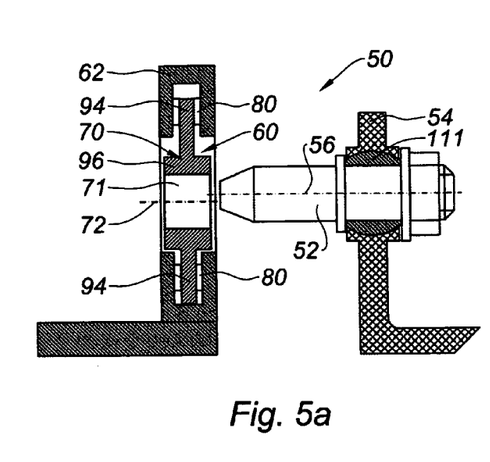
FIGS. 5a and 5b are an alternative of the embodiment of the device according to the invention of FIGS. 3a and 3b.
Figure 5B:
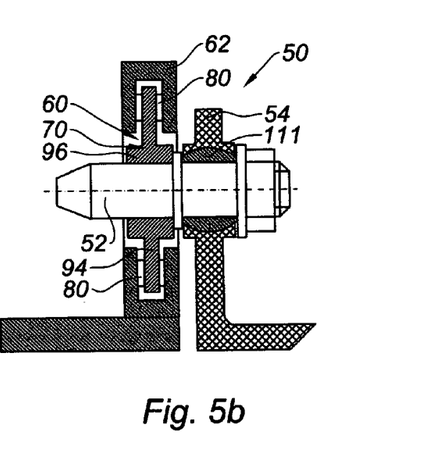

FIGS. 5a and 5b show a third embodiment of the device 50 according to the invention. More particularly, FIG. 5a illustrates a configuration in which the centering pin 52 is not inserted into the receiving bore 60. FIG. 5b illustrates a configuration in which the centering pin 52 is inserted into the receiving bore 60.

According to this other alternative, the centering pin 52 is mounted on a ball pivot 111 fastened in the pin holder 54. In this configuration, the ball pivot has a standard design, the angular displacement limitation of the pin being picked up by the surrounding mechanical parts.

Figure 6A:
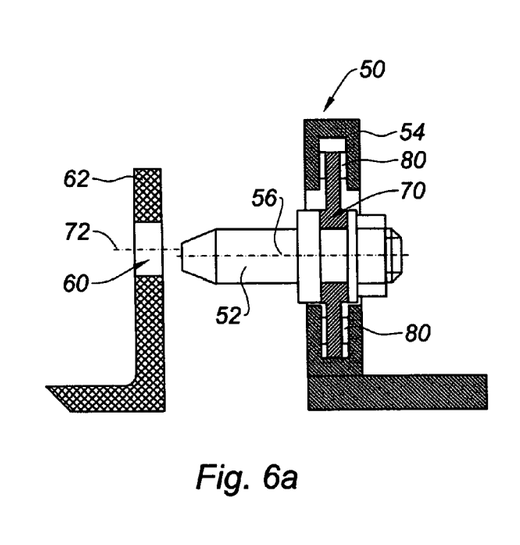
FIGS. 6a and 6b are an alternative of the embodiment of the device according to the invention of FIGS. 3a and 3b.
Figure 6B:
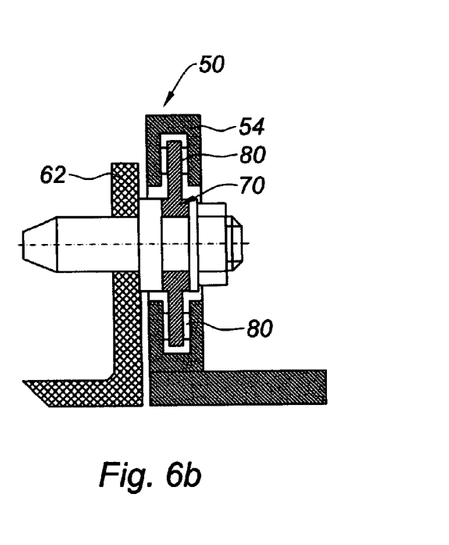

FIGS. 6a and 6b show still another embodiment of the device 50 according to the invention. More particularly, FIG. 6a illustrates a configuration in which the centering pin 52 is not inserted into the receiving bore 60. FIG. 6b illustrates a configuration in which the centering pin 52 is inserted into the receiving bore 60.

According to this alternative, the interface system 70 is mounted on the pin holder 54 mobile in translation along an axis substantially perpendicular to the central axis 56 of said pin. In this case, the centering pin 52 is free in positioning contrary to the receiving bore 60, which is stationary relative to said pin 52. Thus, it is easier to perform the centering relative to a stationary piece. The powering of the control system of the locking means 80 is, for example, carried by the side including the centering pin 52.

According to an embodiment illustrated in FIGS. 7a to 7d, the interface system 70 includes a multitude of locking lugs 121 mounted mobile in the bore holder 62.

Figure 7A:
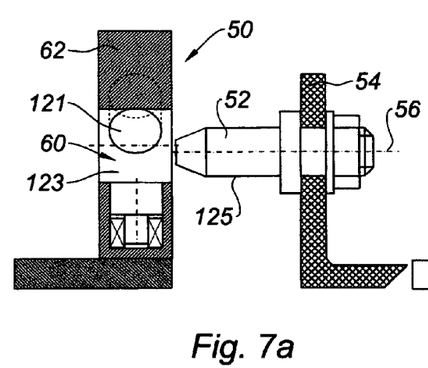
FIGS. 7a to 7d are an alternative of the embodiment of the device according to the invention of FIGS. 3a and 3b, FIGS. 7c and 7d being axial cross-sectional views of the device according to the invention.
Figure 7B:
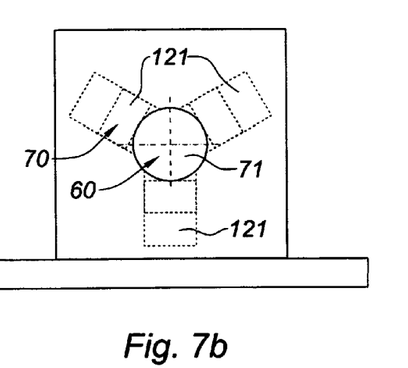
Figure 7C:
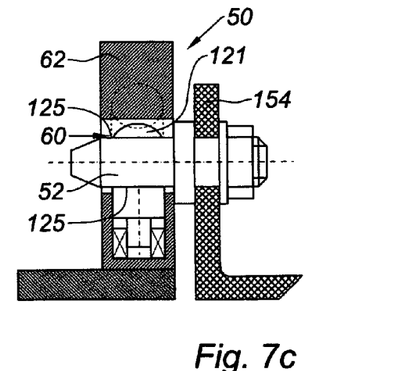
Figure 7D:
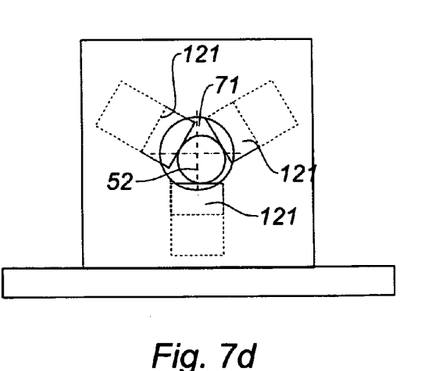

FIGS. 7a and 7b illustrate a configuration in which the centering pin 52 is not inserted into the receiving bore 60. FIGS. 7c and 7d illustrate a configuration in which the centering pin 52 is inserted into the receiving bore 60.

The embodiment thus shown illustrates the use of three locking lugs 121, but those skilled in the art can adapt the number of locking lugs as needed.

The locking lugs 121 advantageously make it possible both to determine the diameter of the central orifice 71 through which the centering pin 52 is inserted into the receiving bore and also to ensure the locking of the centering pin 52 once inserted into the receiving bore 60.

The locking lugs 121 are controlled electrically. The locking lugs 121 can also be controlled independently of each other.

The receiving bore 60 has an orifice with a diameter larger than the diameter of the centering pin 52 so as not to interfere with the operation of the locking lugs 121.

When the centering pin 52 is inserted into the receiving bore 60, the centering lugs 121 are in the high position, i.e. not in contact with the centering pin 52 (see FIGS. 7a and 7b). To that end, the locking lugs 121 are electrically powered, in the advantageous and preferred case where one uses a current outage locking system.

When the centering pin 52 is inserted into the receiving bore 60, the locking lugs come into contact with the lateral portion 125 of the centering pin 52 (see one example of positioning in FIGS. 7c and 7d). In this position, the locking lugs 121 are locked, in particular by absence of electrical power, in order to keep the centering pin 52 in the receiving bore 60 without creating stress in the median structure 5 and the air inlet structure 4.

Figure 8:
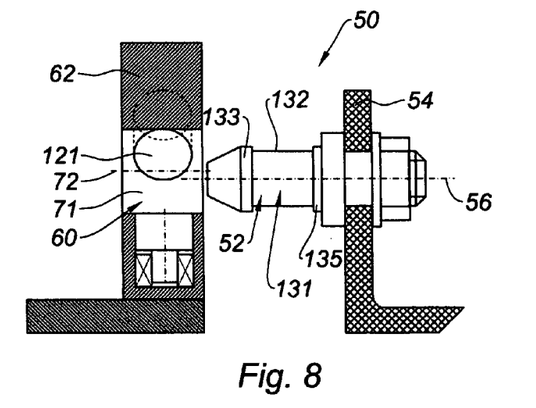
FIG. 8 is an alternative of the embodiment of the device according to the invention of FIGS. 3a and 3b.

According to another alternative shown in FIG. 8, the interface system is similar to that of the embodiment of FIGS. 7a to 7d. The centering pin 52 has a recess 132 on a central portion 131. The central portion 131 then has a first section 133 and a second section 135 surrounding the recess 132 with a diameter smaller than those of the first section 133 and the second section 135.

Such a recess 132 makes it possible to associate the centering function with a locking function in the engagement maneuver direction of the elements in each other. Indeed, it is possible for the axial length of the recess 132 to be substantially equal to that of the locking lugs 121 such that the latter parts are in contact at least partially with the first and second sections 133 and 135.

All of the embodiments illustrated in the different figures can be used alone or in combination.

The present invention is in no way limited to the particular case described above, in which the centering device is inserted between a mobile air inlet lip 4a and the associated internal panel 41.

The present invention more generally covers all cases where the centering device described above is inserted between a mobile structure and a fixed nacelle structure of an aircraft engine.

The invention claimed is:

1. A device for centering a mobile structure on a fixed structure of a nacelle, comprising:
    a centering pin mounted on a pin holder attached onto the mobile structure or onto the fixed structure, the centering pin having a central axis, and
    a receiving bore mounted onto a bore holder attached onto the fixed structure or onto the mobile structure, said receiving bore being capable of receiving at least the centering pin,
    wherein the centering device also comprises a movable interface system, configured for overlapping the central axis of the centering pin and the central axis of said interface system or of the receiving bore and configured for receiving said centering pin in a central opening, and a locking means configured for locking said interface system.

2. The device according to the claim 1, wherein the central axis of the interface system and the central axis of the centering pin are substantially parallel and not distinct from each other.

3. The device according to claim 2, wherein the interface system is a disc whereof the central orifice has a diameter substantially equal to that of the centering pin.

4. The device according to claim 3, wherein the disc includes a peripheral portion surrounding a central portion, said peripheral portion being thinner than the central portion.

5. The device according to claim 1, wherein the interface system is mounted mobile in translation in the receiving bore along an axis substantially perpendicular to the central axis of the interface system.

6. The device according to claim 1, wherein the locking means include locking pads suitable for locking the peripheral portion.

7. The device according to claim 6, wherein the locking pads are activated electrically.

8. The device according to claim 1, wherein the interface system includes a ball pivot mounted in the central orifice of the disc.

9. The device according to claim 1, wherein the pin is mounted on a ball pivot fastened in the pin holder.

10. The device according to claim 1, wherein the interface system is mounted on the pin support mobile in translation along an axis substantially perpendicular to the central axis of said pin.

11. The device according to claim 1, wherein the interface system includes a multitude of locking lugs mounted mobile in the bore holder.

12. The device according to claim 11, wherein the centering pin has a first section and a second section surrounding a recess having a diameter smaller than those of the first section and the second section.

13. The device according to claim 1, wherein said mobile structure is an air inlet structure and said fixed structure is a median nacelle structure.

14. A nacelle for a turbojet engine comprising an air inlet structure and a median structure, wherein the nacelle includes a centering device for centering the air inlet structure on the median structure according to claim 13.

\* \* \* \* \*